United States Patent [19]

Everett

[11] Patent Number: 4,664,136
[45] Date of Patent: May 12, 1987

[54] PRESSURE REGULATING TRANSDUCER
[75] Inventor: William F. Everett, South Bend, Ind.
[73] Assignee: South Bend Controls Inc., South Bend, Ind.
[21] Appl. No.: 307,390
[22] Filed: Oct. 1, 1981
[51] Int. Cl.[4] .................... G05D 16/00; F16K 31/06
[52] U.S. Cl. .................... 137/85; 251/129.08; 251/129.15
[58] Field of Search ........... 137/82, 85, 505.42; 251/129, 131

[56]            References Cited
            U.S. PATENT DOCUMENTS

| 2,447,067 | 8/1948 | Hamilton | 137/505.42 |
| 2,777,456 | 1/1957 | Ey | 137/505.42 X |
| 3,094,132 | 6/1963 | Byloff | 137/85 |
| 3,598,138 | 8/1971 | Hadley | 137/85 |
| 3,926,405 | 12/1975 | Arnold | |
| 3,985,333 | 10/1976 | Paulsen | 251/129 |
| 4,207,914 | 6/1980 | Holloway | 137/85 |
| 4,313,590 | 2/1982 | Nishimiya | 251/129 |
| 4,314,585 | 2/1982 | Nishimiya | 251/129 X |

Primary Examiner—Alan Cohan
Attorney, Agent, or Firm—Barnes & Thornburg

[57] ABSTRACT

A pressure regulating transducer for providing a regulated output pressure in response to an electric input signal in which a proportional solenoid operates a valve, and the output pressure from the valve operates against the force generated by the solenoid to establish the position of a valve element for a regulated fluid output pressure. The position of the valve element will vary in response to flow changes, absolute pressure changes, and changes in the inlet or outlet pressures caused by leaks or restrictions, to maintain the designated outlet pressure for the input signal provided. Thus, a predetermined outlet pressure is maintained for each current input value, regardless of flow and/or absolute pressure changes.

17 Claims, 4 Drawing Figures

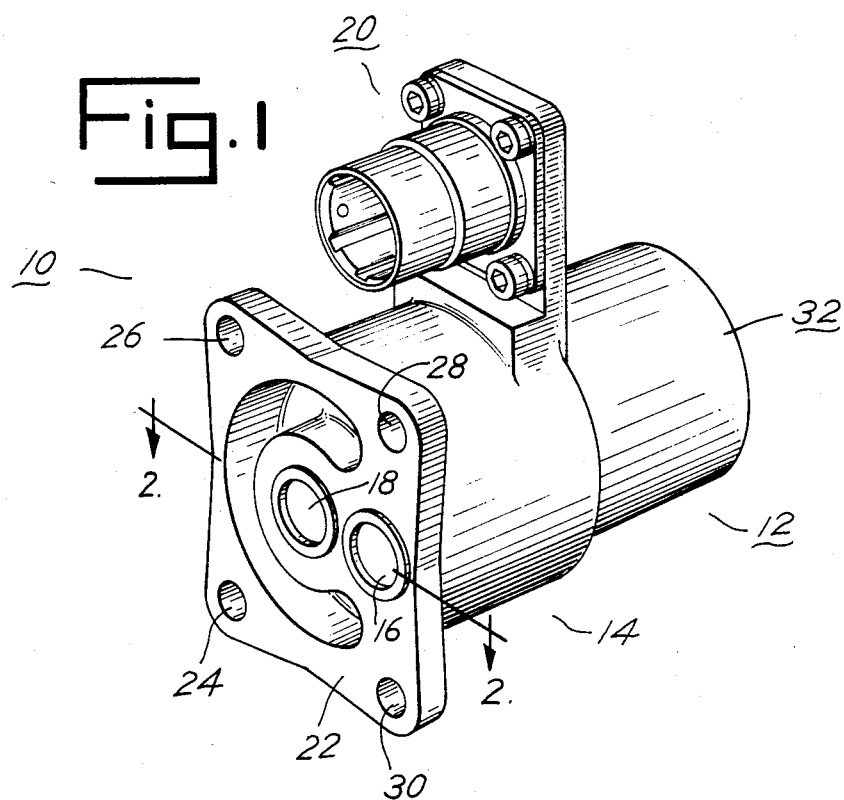
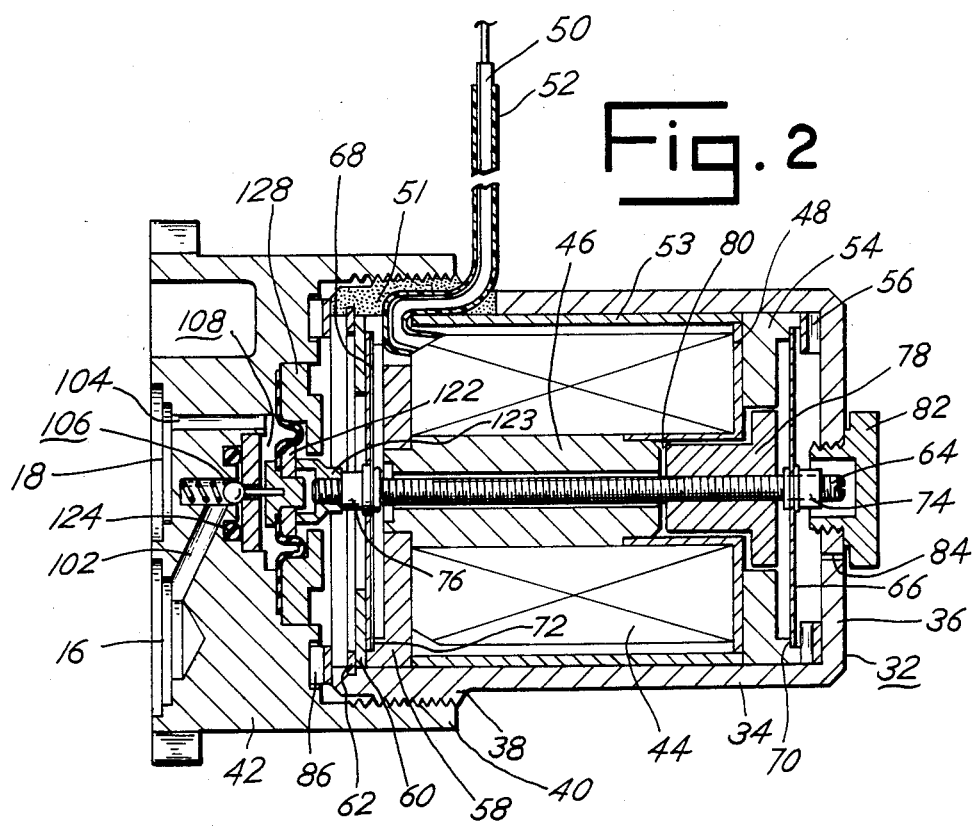

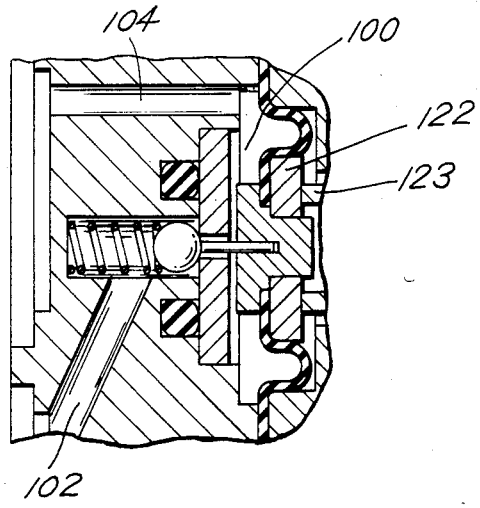
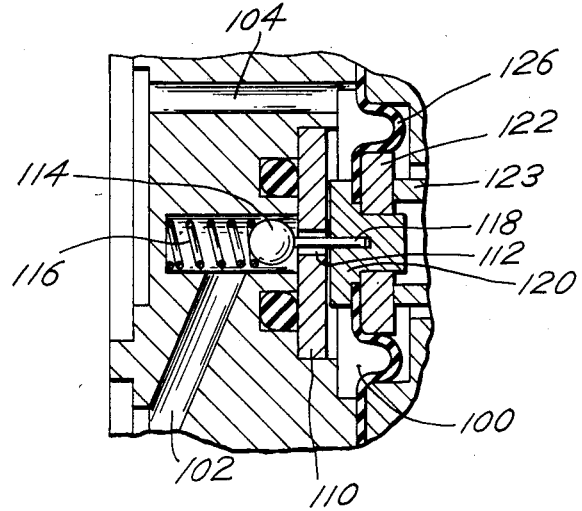

PRESSURE REGULATING TRANSDUCER

BACKGROUND OF THE INVENTION

Electrical to pressure (E to P) transducers are used in many fields for converting an electrical signal input to a pressure output for operating a pneumatic or hydraulic device. For example, the air flow in the heating and cooling system of an aircraft is often controlled by a pneumatically operated valve having an E to P transducer which comprises the pilot section of the valve. A frequently used assembly includes an electromagnetic device, such as a torque motor, for receiving an electrical signal input and for operating a flapper positioned near a nozzle in a variable orifice arrangement. The movement of the flapper is proportional in magnitude and direction to the input signal. The nozzle and flapper assembly is placed in series with a fixed orifice and is provided with a pressurized air supply. The stage pressure can be varied by varying the electrical supply to the torque motor and hence the position of the flapper.

A torque motor controlled flapper and nozzle arrangement functions well in controlled environments; however, in applications such as the aforementioned heating and cooling system of an aircraft this type of device often is unreliable in that it experiences extreme variations in environmental conditions which adversely affect its operation. For example, the stage pressure will vary with variations in the inlet pressure, and, in aircraft, changes in the engine operating conditions will affect the pressurized air supply and therefore the inlet pressure.

Yet another problem encountered, particularly with aircraft utilizing the aforedescribed variable orifice device, is that flow and pressure change with changes in the absolute pressure at the inlet and outlet. Thus, the controlled stage pressure will vary with altitude in that the absolute pressure decreases with increasing altitude. Since the stage pressure is extremely sensitive to flow, if changes occur in the fixed orifice, such as the accumulation of dirt particles which restrict the orifice, or if additional flow is drawn from the stage pressure cavity to operate the main valve or as the result of a leak occurring in the stage pressure cavities, the correlation between the variable orifice and the stage pressure will also change. The orifices and nozzles are highly sensitive to the accumulation of even minute particles of contamination, and integral filters are required to remove harmful contamination. However, the filters have not always functioned as effectively as desired.

Another problem encountered in pressure operated systems which experience extreme variations in environmental conditions is that pressure regulators often contain a compression spring or pilot pressure above a diaphragm for providing a bias force. To operate properly, the regulator must have a low spring rate or bias force, and conventional regulators are therefore sensitive to vibration. Because of the physical forces encountered in aircraft, vibration sensitive regulators do not function accurately.

SUMMARY OF THE INVENTION

It is therefore one of the principal objects of the present invention to provide a pressure regulating transducer which supplies a pressure regulated fluid output in proportional relationship to an electrical input signal, and which operates accurately from low pressure to high pressure input while maintaining the proportional relationship to the electrical input signal.

Another object of the present invention is to provide a pressure regulating transducer which supplies a consistent, regulated pressure output when experiencing physical vibration, and which includes pressure sensing feedback so that stage pressure is not significantly affected by particles of contamination in the device.

Still another object of the present invention is to provide a pressure regulating transducer which maintains the desired outlet pressure in the face of variations in the absolute inlet and outlet pressures, and which maintains the outlet pressure even with variations in the inlet or outlet pressures caused by flow changes.

These and other objects are achieved in the present invention by providing an electromagnetic actuator, preferably of the proportional solenoid type, and a ball-type valve assembly, in which a shaft is moved axially in response to an electrical input signal in the actuator, and displaces a ball from a seat in the valve assembly. The outlet pressure from the valve exerts a force against a diaphragm connected to the shaft for establishing an equilibrium condition between the force from the electromagnetic actuator and the outlet pressure. For every current input value causing a force in the actuator for moving the ball, an equilibrium establishing outlet pressure exists. Changes in inlet or outlet pressures caused by contamination, leaks or absolute pressure changes result in movement of the ball relative to the seat, thereby either increasing or decreasing the flow, and therefore the pressure output, to re-establish the equilibrium condition. Since the electromagnetic force from the electromagnetic actuator is proportional to the input current, and the output pressure is proportional to the electromagnetic force from the actuator, the output pressure is therefore proportional to the input current. High spring rates can be used in the support springs of the actuator to minimize the effects of vibration on performance of the regulating transducer, and the relationship of the pressure regulated output to the input signal can be shaped as required for a particular application.

These and other objects will become apparent from the detailed description and the accompanying drawings.

BRIEF DESCRIPTION OF THE DRAWINGS

FIG. 1 is a perspective view of a pressure regulating transducer embodying the present invention;

FIG. 2 is a cross sectional view of the pressure regulating transducer shown in FIG. 1, taken on line 2—2 of the latter figure;

FIG. 3 is an enlarged fragmentary view of the valve section of the pressure regulating transducer; and FIG. 4 is an enlarged fragmentary view similar to that of FIG. 3, but showing the valve in an open position for the transmittal of a fluid between the inlet and the outlet openings of the valve.

DETAILED DESCRIPTION OF THE PREFERRED EMBODIMENT

Referring now more specifically to the drawings, and to FIG. 1 in particular, numeral 10 designates a pressure regulating transducer embodying the present invention which converts an electric current input signal to a regulated pneumatic pressure output signal which is proportional to the input signal. The pressure regulating transducer includes an electromagnetic actuator 12 which receives the current input signal and converts the signal to a mechanical output, and a valve assembly 14 controlled by the electromagnetic actuator to regulate the fluid flow between an inlet 16 and an outlet 18. An electrical receptacle assembly 20 is provided on the regulating transducer for connecting the regulating transducer to a controlled variable current source for providing the input signal. Various types of receptacles may be used, or the regulating transducer can be hardwired to the current source. A plate 22 is disposed on the end of the regulating transducer for mounting the assembly, and holes 24, 26, 28 and 30 are provided in the plate for receiving bolts or the like when the regulating transducer is mounted in a system.

The electromagnetic actuator 12 may be of any suitable type for receiving an electrical current input signal and translating the input to a proportional axial mechanical output, the force of which is balanced against the pressure of a fluid from valve assembly 14. Various types of proportional solenoids are suitable for the electromagnetic actuator, and an embodiment of a suitable type will be described more fully hereinafter, with reference particularly to FIG. 2.

Electromagnetic actuator 12 includes a housing 32 having a side wall 34 and an end wall 36. The side wall includes a threaded portion 38 for securing the housing to a threaded portion 40 of a valve body 42 of valve assembly 14, and plate 22 is connected to the valve body, either integrally or otherwise. A coil 44 is disposed on a core 46 and a bobbin 48, and the coil is connected by a wire lead 50 to receptacle 20 for receiving an electrical current input signal from a controlled variable current source. The opening in housing 32 through which lead 50 extends is filled with a filler material 51 for sealing around the lead, and a protective covering 52 is provided on the lead. A shell 53 is disposed around the coil, between the coil and side wall 34 of housing 32. A front ring 54 is disposed between bobbin 48 and a wave washer 56 adjacent end wall 36, and a rear ring 58 is held against shell 53 by washer 60 and a retaining ring 62. A shaft 64, axially moveable in core 46, is supported by front and rear support springs 66 and 68 disposed against shoulders 70 and 72 of the front and rear rings, respectively. The shaft is connected to the support springs by nuts 74 and 76 which engage threads on the shaft. An armature 78 is disposed on shaft 64 and is axially moveable in bobbin 48. The armature is spaced from core 46, creating a gap 80, and an electromagnetic field is established across the gap when current is introduced to coil 44. The electromagnetic flux across the gap causes a force on the armature directed toward the core and transmitted down shaft 64.

An opening is provided in end wall 36 of housing 32, and a removeable plug 82 is provided for the opening so that adjustment of the electromagnetic actuator can be made without disassembling the pressure regulating transducer. A vent opening 84 is provided in end wall 36, and a wave washer 86 is disposed between side wall 34 and valve body 42 of valve assembly 14.

Inlet 16 and outlet 18 communicate with a chamber 100 in valve body 42 through passages 102 and 104. A valve element and seat assembly 106 operated by a plunger/diaphragm assembly 108 connected to shaft 64 is disposed between the inlet and outlet and controls the flow of a fluid through the valve. The element and seat assembly includes a seat 110 having an opening 112, and a ball 114 disposed on the side of seat 110 opposite shaft 64 and biased against the seat by a spring 116. Thus, when ball 114 is disposed in opening 112 of seat 110, fluid from inlet 16 and passage 102 will not flow through the seat to passage 104 and outlet 18. Ball 114 is disposed against a pin 118 which extends through opening 112 and is connected on the side of the seat opposite ball 114 to a plunger 120. The plunger is connected to a washer 122 which is disposed against a nut 123 on the end of shaft 64. A sealing ring 124 is disposed between seat 110 and valve body 42 to prevent leakage of fluid between the seat and the valve body. Chamber 100 is sealed on the side of the seat opposite sealing ring 124 by a diaphragm 126, which comprises a moveable wall portion of the chamber. The diaphragm provides a rolling frictionless seal between plunger 120 and washer 122 and between valve body 42 and a diaphragm retainer 128.

In the use and operation of a pressure regulating transducer embodying the present invention, inlet 16 and outlet 18 are connected to a pressure fluid system wherein pressurized fluid is provided to inlet 16 and the regulated pressurized fluid flow from outlet 18 performs a work function in the system. Receptacle 20 is connected to a controlled, variable electric current source for providing an electrical signal to coil 44. The electrical current source is a controlled source having a current value corresponding to each desired pressure output from outlet 18. When no current signal is provided to the coil, spring 116 biases ball 114 toward seat 110 so that the ball closes opening 112 in the seat, and the pressurized fluid entering the valve body through inlet 16 will not pass from passage 102 to chamber 100.

When a current signal is introduced to coil 44 through lead 50, the electric field created through the coil, core and armature causes an electromagnetic flux across gap 80 and exerts a force on the armature toward the core. Thus, for each current value introduced to the coil, armature 78 will move a given distance toward core 46, thereby causing a corresponding axial movement of shaft 64 which is transmitted through nut 123, plunger 120 and pin 118 to ball 114. The ball is moved against spring 116 and away from opening 112, thereby allowing the pressurized fluid to flow from passage 102 to chamber 100. The fluid will flow from chamber 100 through passage 104 and out of the valve body through outlet 18. As the pressurized fluid flows into chamber 100, a force is exerted on diaphragm 126. This outlet pressure equilibrates against the force caused by the electromagnetic flux across the gap. Thus, for every value of input current causing axial movement of shaft 64, there exists a balancing output pressure which causes an equilibrium condition with the force exerted by the electromagnetic actuator. If the output pressure drops due, for example, to an increased flow caused by a leak in the system, the equilibrium condition is disrupted and the force exerted by the electromagnetic flux across the gap will be greater than the pressure against diaphragm 126. Thus, ball 114 will move farther from seat 110, and the flow of fluid through the seat will increase until the pressure against the diaphragm again equilibrates with the force exerted by the electromagnetic actuator. If, on the other hand, the output pressure increases, due, for example, to a reduced flow caused by contamination of the downstream fixed orifice, the equilibrium condition will again be disrupted. In this situation the increased pressure against the diaphragm causes shaft 64 to move in the opposite direction from that previously described, thereby causing ball 114 to move closer to seat 110. Thus, the flow through the seat will be reduced, causing a corresponding reduction in the output pressure until an equilibrium condition is again established between the two forces operating against the diaphragm and shaft. Thus, a constant outlet pressure is maintained regardless of leaks, contamination and/or increases or decreases in the inlet pressure supply.

The relationship between input current introduced to coil 44 and the output pressure from outlet 18 is proportional, in that the electromagnetic force against the plunger/diaphragm assembly is proportional to the input current, and the outlet pressure against the plunger/diaphragm assembly is proportional to the position of ball 114 with respect to seat 110, which is controlled by the axial movement of shaft 64, caused by the electromagnetic force.

It is clear that fluid system changes as well as changes in ambient conditions will not affect the relationship between the current input signal and the output pressure. Thus, altitude changes will not affect the flow from the pressure regulating transducer. The pressure regulating transducer is easily adapted to various pressure fluid systems, in that the electromagnetically generated force which causes movement of the ball with respect to the seat can be varied to achieve different proportional relationships between the input current and the output pressure. Stiff springs may be used for support springs 66 and 68 to minimize the effects of vibration on the performance of the pressure regulating transducer. This is a particular advantage in applications such as air craft systems, in that conventional regulators necessarily have low spring rates and are therefore sensitive to vibration.

Although one embodiment of a pressure regulating transducer has been shown and described in detail herein, various changes may be made without departing from the scope of the present invention.

I claim:

1. A pressure regulating transducer comprising an electromagnetic actuator for receiving a controlled variable current input signal and translating said input signal to a mechanical movement output generated by electrical force, said actuator having an axially moveable shaft and high spring rate springs for supporting said shaft for free axial movement, a valve assembly having an inlet port for the flow of fluid from a pressurized fluid source and an outlet port for the flow of controlled pressure fluid to a device to be operated by the fluid, said valve assembly having a variable orifice including a valve element connected to and controlled by said actuator with said inlet port disposed on one side of said valve element and said outlet port disposed on the opposite side of said valve element, said mechanical movement of said actuator being in proportional relationship to said input signal and the fluid output pressure of said valve assembly being proportional to said input signal, and a means for establishing equilibrium between said fluid output pressure and said electrical force for each force generated by a current input signal.

2. A pressure regulating transducer as defined in claim 1 in which said electromagnetic actuator is a proportional solenoid having a coil and a linearly moveable armature connected to said shaft, and the electromagnetic force on said shaft is proportional to the current input signal.

3. A pressure regulating transducer as defined in claim 2 in which said valve assembly includes a ball and a seat, and said ball is connected to said shaft and moveable relative to said seat in relationship to the movement of said shaft.

4. A pressure regulating transducer as defined in claim 3 in which said shaft is connected to a plunger, and a stem extending through said seat is disposed between said plunger and said ball.

5. A pressure regulating transducer as defined in claim 4 in which a rolling frictionless diaphragm is attached to said plunger and extends outwardly therefrom, and a chamber partially defined on one side by said seat and on an opposite side by said plunger and said diaphragm receives fluid from said source flowing through said seat, and a fluid outlet communicates with said chamber.

6. A pressure regulating transducer as defined in claim 5 in which a spring is disposed against said ball on the side opposite said stem.

7. A pressure regulating transducer as defined in claim 1 in which said valve includes a valve body attached to said actuator, and said valve body includes said inlet and outlet ports and a fluid passageway between said inlet and said outlet, and a ball and a seat are disposed in said passageway for controlling the flow of fluid therethrough.

8. A pressure regulating transducer as defined in claim 7 in which said electromagnetic actuator includes a linearly moveable shaft, and said ball is connected to said shaft for movement relative to said seat.

9. A pressure regulating transducer as defined in claim 8 in which said shaft is connected to a plunger, and a stem extends outwardly from said plunger through said seat and is disposed against said ball for moving said ball in relationship to the movement of said shaft.

10. A pressure regulating transducer as defined in claim 9 in which a chamber is disposed in said valve on the side of said seat opposite said ball, a diaphragm is disposed in said chamber extending outwardly from said plunger, and said outlet communicates with said chamber.

11. A pressure regulating transducer comprising a means for receiving an electrical current input signal and for translating said electrical current input signal into a mechanical movement generated by an electromagnetic force, including a coil, a shaft disposed in said coil and mounting springs of high spring rate at each end of said coil and shaft for supporting said shaft for free axial movement proportional to the input signal, a valve operated by said shaft for controlling the flow of a fluid therethrough having a valve element therein, said valve having an inlet port on one side of said valve element and an outlet port for controlled fluid on the opposite side of said valve element, and a means for balancing the pressure of the controlled fluid at the outlet port on the opposite side of said valve element against said electrical force for each and every current valve received by said first mentioned means.

12. A pressure regulating transducer as defined in claim 11 in which said first mentioned means includes a proportional solenoid.

13. A pressure regulating transducer as defined in claim 12 in which said shaft is connected to said valve element which is moveable relative to a seat for controlling the flow of a fluid through said valve, and the pressure of the controlled fluid at the outlet port on the opposite side of said valve operates to establish an equilibrium condition with said electromagnetic force.

14. A pressure regulating transducer comprising an electromgnetic actuator having an axially moveable shaft, flat mounting springs with high spring rates disposed at each end of said shaft and forming the sole support for said shaft for free axial movement, means in said actuator for receiving an electrical current signal and for creating an electrical force moving said shaft in relation to the current signal value, a valve body connected to said actuator having a chamber therein, an inlet opening in said body connected to said chamber by a first passage, an outlet opening in said body connected to said chamber by a second passage for a controlled fluid to a device to be operated thereby, a seat disposed between said chamber and said first passage, a ball moveable relative to said seat for opening and closing an orifice in said seat, said inlet opening disposed on one side of said ball and said outlet opening disposed on the opposite side of said ball, means for connecting said ball to said shaft, and a means for establishing an equilibrium condition between the force of fluid passing through said chamber and said electromagnetic force.

15. A pressure regulating transducer as defined in claim 14 in which said ball is disposed in said first passage and a stem is disposed between said ball and said shaft.

16. A pressure regulating transducer as defined in claim 15 in which said chamber includes a moveable wall portion connected to said shaft, and said fluid flow pressure operates against said moveable wall and said shaft to establish an equilibrium condition against said electromagnetic force.

17. A pressure regulating transducer as defined in claim 16 in which said moveable wall is a rolling frictionless diaphragm.

* * * * *